ROBERT E. MARINGER
LEONARD P. RICE
INVENTORS.

United States Patent Office 3,556,778
Patented Jan. 19, 1971

3,556,778
TERNARY DAMPING ALLOY
Robert E. Maringer, Worthington, and Leonard P. Rice, Columbus, Ohio, assignors to American Potash & Chemical Corporation, New York, N.Y., a corporation of Delaware
Filed Oct. 14, 1968, Ser. No. 767,365
Int. Cl. C22c *31/00*
U.S. Cl. 75—134
4 Claims

ABSTRACT OF THE DISCLOSURE

A ternary damping alloy consisting essentially of between about 60% and 70% by weight manganese, between about 30% to 40% by weight copper and between about 0.25% to 5% by weight vanadium. The ternary alloy is characterized by excellent damping capacity over a wide temperature range, both above and below room temperature. The inclusion of vanadium in the alloy assists in stabilizing the damping at the upper temperature range and improves low temperature ductility of the alloy.

BACKGROUND OF THE INVENTION

(1) Field of the invention

This invention relates to an improved damping alloy. More particularly, the invention relates to a ternary manganese-copper base alloy having excellent damping capacity, improved low temperature ductility and improved damping characteristics at elevated temperatures.

(2) Description of the prior art

The use of damping materials and devices is an important aspect of modern technology. Such materials and devices are used to isolate machinery, vehicular and airborne equipment and delicate instruments from vibration. Similarly, damping devices that range from minute parts in high-fidelity sound and electronics equipment to the shock absorbers on large vehicles are commonly used today.

Materials that have high damping capacity are very desirable for use in such applications. However, many materials that have high damping capacity may be deficient in other properties. For example, while cast iron has excellent damping capacity its deficiency in ductility and yield strength makes it undesirable for many applications. Manganese-copper alloys are known to have high vibration-damping capacity, particularly at room temperature. It is also well known that the damping capacity of such manganese-copper alloys decreases as the temperature increases and may be only a fraction of its room-temperature value at about 100° C. Consequently, the damping characteristics of such binary manganese-copper alloys is generally unsatisfactory when it is necessary to maintain the material at elevated temperatures for extended periods of time. In addition, the ductility of such binary manganese-copper alloys is generally reduced at low temperatures.

SUMMARY OF THE INVENTION

It has been found that ternary manganese-copper-vanadium alloys have a high damping capacity over a wide temperature range, both above and below room temperature, and that such alloys have improved ductility at low temperatures and improving damping characteristics at elevated temperatures. Control of the heat treatment of the ternary alloys of this invention is important in developing the full damping potential of the alloys. Thus, it has been discovered that the damping capacity of the alloys at elevated temperatures may be improved by aging the alloys for extended periods of time.

DESCRIPTION OF THE PREFERRED EMBODIMENTS

Figure 1:
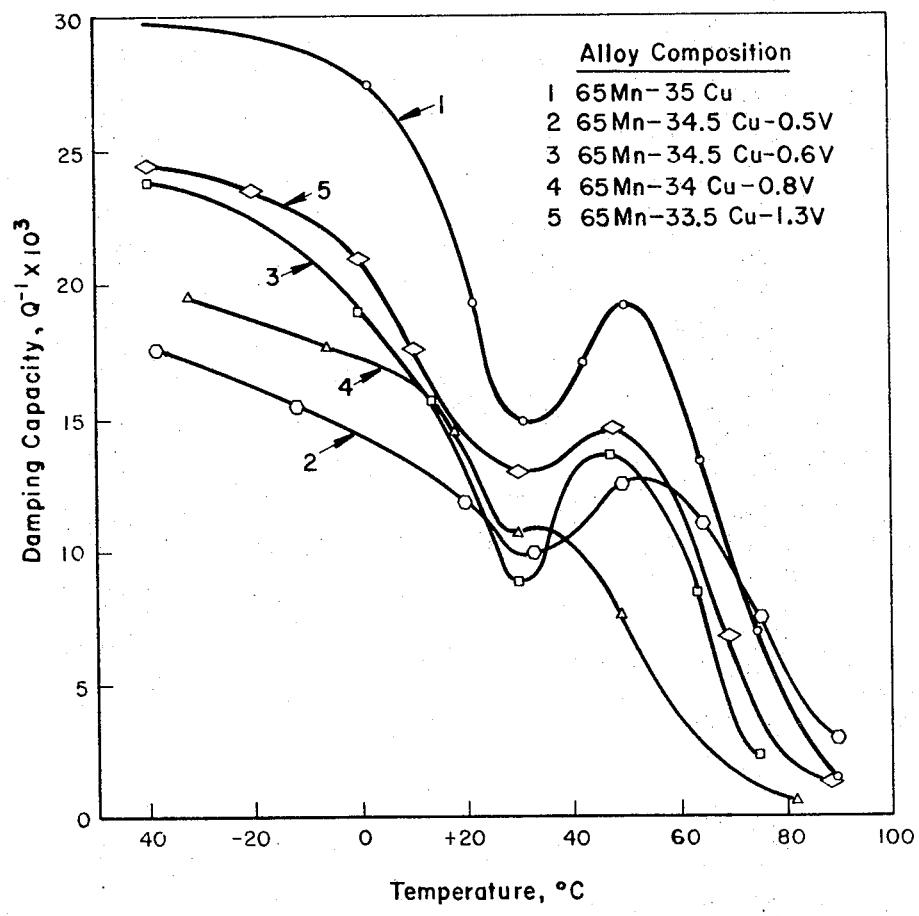
FIG. 1 is a graph wherein a series of curves are set forth illustrating the damping capacity of a number of alloys.

The alloy of the present invention consists essentially of about 60% to 70% by weight manganese, about 30% to 40% by weight copper and about 0.25% to 5% by weight vanadium. Preferably, this ternary alloy contains between 64% to 66% manganese, between 33% to 36% copper and between 0.5% to 1.5% vanadium.

Alloys having such a composition not only possess high damping capacity over a wide range of temperatures but also have good ductility at low temperatures and improved damping characteristics at elevated temperatures.

It is well known that binary allows of manganese and copper, containing from 60% to 80% manganese, possess vibration-damping capacity in an unusually high degree. Such binary alloys may be cast and fabricated in a number of ways familiar to those skilled in the art, such as for example, by the technique discussed in Bureau of Mines Report of Investigations 5127, "Casting and Fabrication of High-Damping Manganese-Copper Alloys," 1955.

The combination of small amounts of vanadium with manganese and copper unexpectedly provides a ternary alloy having a relatively high damping capacity. While such a ternary alloy, containing between about 0.25% to 5% by weight vanadium, has a damping capacity slightly less than that of the binary manganese-copper alloy, the ternary alloy of this invention possesses a number of advantages over the binary alloy which makes the use of such a ternary alloy particularly advantageous for certain applications.

Thus, the inclusion of small amounts of vanadium in the managanese-copper base alloy improves the low temperature ductility of the alloy. For example, an alloy containing 65% managanese, 34.4% copper and 0.6% vanadium, when tested at −196° C., exhibited an elongation (ductility) about 28% greater than a binary alloy containing 64% managnese and 36% copper, when tested under similar conditions.

Also, as noted hereinabove, the specific damping capacity of binary manganese-copper alloys is adversely affected by increasing temperatures, and at temperatures of about 100° C. and above, the damping capacity of the alloy is only a fraction of its value at room temperature and below. This reduction in damping capacity is particularly severe when it is necessary to maintain the alloy at high temperatures for extended periods of time. Thus, for example, when a binary alloy containing 64% manganese and 36% copper is maintained at 100° C. for 3.5 hours the damping capacity of the alloy is reduced about 97%. This reduction in damping capacity is much less severe with the ternary alloy of this invention. Thus, when an alloy containing 65% manganese, 34.4 copper and 0.6% vanadium is held at 100° C. for 2.5 hours, the damping capacity is reduced only about 10%. When this ternary alloy is held at that temperature for 19 hours, the damping capacity is reduced only about 38%, less than half of that of the binary alloy.

In addition, it has been found that control of the heat treatment of the alloy is important in developing the full damping potential of the alloy. For example, the damping capacity of the alloy at the upper end of the temperature range may be increased by increasing the aging time to which the ally is subjected. It has been disclosed in the literature that maximum damping capacity is developed in manganese-copper alloys by subjecting the alloys to an aging temperature of 450° C. for about 1-2 hours. However, even when subjected to this optimum aging treatment, the binary alloys have only slight damping capacity at temperatures above about 90° C. It has now been found that good damping capacity of the ternary alloys of this invention can be obtained at temperatures above 100° C. by increasing the aging time to at least about 4 hours. This treatment enables the alloys to be used at temperatures at which the conventionally aged binary alloys are not suitable for use due to low damping capacity.

Also, it has been found possible to control to some extent the torsional modulus values of the ternary alloy of this invention by controlling the aging temperature to which the alloy is subjected. Thus, it has been found that a considerable degree of control may be effected over the torsional modulus of the ternary alloy by altering the aging temperature within a range of between 350° and 450° C. Aging at 350° C. has been found to provide a slight increase in the torsional modulus from low to high temperature. When age at 400° C., the modulus increased considerably from low to high temperatures. Aging at 450° C. caused the modulus to decrease from low temperatures to about 90° C. and then increase at temperatures above about 90° C.

In order to demonstrate the properties of the ternary damping alloys of this invention and compare the properties of the ternary alloy to those of a conventional binary manganese-copper alloy, a series of five alloys was prepared according to the same procedure, using high purity elements. The composition of these alloys is set forth in Table I.

TABLE I

| | Chemical composition, percent [1] | | |
|---|---|---|---|
| | Mn | Cu | V |
| Alloy No.: | | | |
| 1 | 64.0 | 36.0 | |
| 2 | 65.0 | 34.5 | 0.5 |
| 3 | 65.0 | 34.3 | 0.6 |
| 4 | 65.0 | 34.0 | 0.8 |
| 5 | 65.0 | 33.5 | 1.3 |

[1] Small amounts of impurity elements were present but not analyzed for.

After casting and forging, each of the alloys was solution treated by heating at about 900° C. for 1 hour followed by quenching in cold water and then aged by heating at about 450° C. for 1 hour followed by quenching in cold water.

The damping capacity of each alloy was then measured at about 300 p.s.i. maximum fiber stress in a conventional torsion pendulum apparatus. The damping capacity, reported as $Q^{-1} \times 10^3$, is determined by the formula $$Q^{-1} = \frac{1}{\pi n} \ln \frac{A_o}{A_n}$$

in which $n$ is the number of cycles for the amplitude to decrease from $A_o$ to $A_n$. The low stress damping capacity data for each of the five alloys over a wide temperature range are shown in FIG. 1, in which the curves identified as 1, 2, 3, 4 and 5 were obtained by testing compositions 1 through 5 in Table I, respectively.

As shown in FIG. 1, the binary manganese-copper alloy (No. 1) possessed the highest overall damping, with the ternary vanadium-containing alloys having a slightly lower damping capacity. It is to be noted, however, that the damping capacity of the ternary alloys is still relatively high over a considerable temperature range and quite satisfactory for many applications.

The damping capacity of these alloys is strongly stress dependent, with damping capacity increasing with an increase in stress. Thus, for example, damping at a maximum outer fiber stress of 1400 p.s.i. is considerably greater than at 300 p.s.i. Furthermore, damping at a higher stress, such as 1400 p.s.i. is more sensitive to changes in temperature than damping at lower stresses, for example, 300 p.s.i., particularly at low temperatures, down to −190° C. where damping is still increasing in some of the alloy compositions of this invention.

The damping capacity of each alloy tested was found to increase substantially as the temperature was lowered, even as low as −190° C. The usefulness of the alloys at such very low temperatures depends to a considerable extent on their tensile strength and ductility at low temperatures. The low temperature data of several of the alloys is reported in Table II. The composition of these alloys is the same as set forth in Table I.

TABLE II

| | Test temp., °C. | Tensile strength, p.s.i. | Elongation, percent |
|---|---|---|---|
| Alloy No.: | | | |
| 1 | 24 | 95,000 | 23.0 |
| | −196 | 125,200 | 10.0 |
| 2 | 24 | 102,000 | 24.5 |
| | −196 | 128,000 | 23.0 |
| 3 | 24 | 90,000 | 25.4 |
| | −196 | 115,300 | 38.5 |
| 5 | 24 | 90,600 | 9.0 |
| | −196 | 117,600 | 28.0 |

These data show that each of the alloys tested had good tensile strength both at room temperature and at very low temperatures. These data also show that alloys 2, 3 and 5, alloys of the present invention, have excellent elongation (ductility) at low temperatures, thereby demonstrating that the ternary alloys of this invention have improved low temperature ductility as compared to binary manganese-copper alloys. This good low temperature ductility together with good tensile strength and relatively high damping capacity at such low temperatures make the alloys of this invention particularly well suited for cryogenic applications.

As noted hereinabove, the damping capacity of the alloys of the present invention at high temperatures may be improved by subjecting the alloys to an extended aging treatment at a temperature of about 450° C. When the alloys are aged at 450° C. for at least four hours, and preferably between four and eight hours, instead of one to two hours as is the general practice today, the alloys exhibit good damping characteristics at temperatures above 100° C. In order to demonstrate this marked change in damping characteristics, alloys 3 and 5 of Table I were subjected to an increased aging time at 450° C. and the damping characteristic determined and compared to that obtained after a conventional heat treatment. The results of these tests are illustrated in FIGS. 2 and 3.

Figure 2:
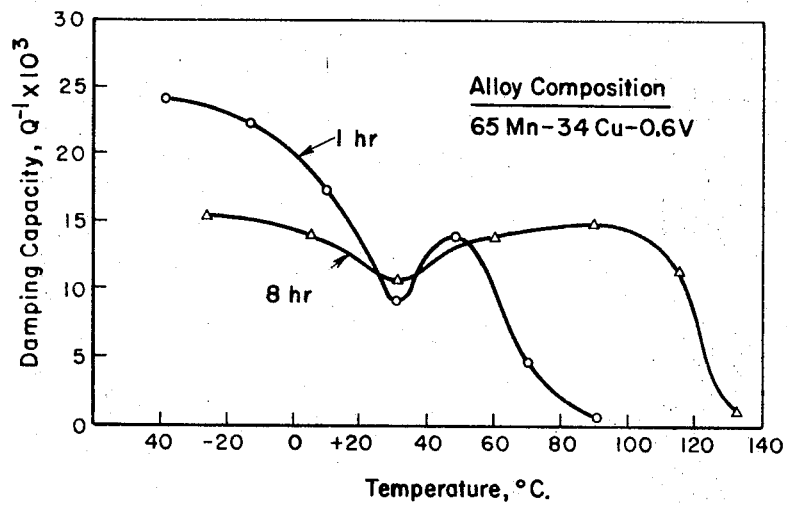
FIGS. 2 and 3 are graphs showing the effect of an extended aging treatment on the damping capacity of two alloys of the present invention.
Figure 3:
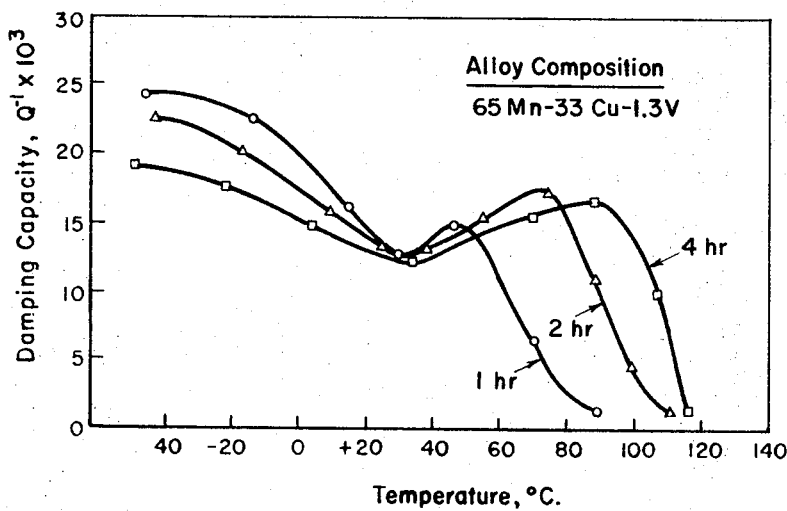

FIG. 2 shows the damping characteristics of alloy 3 (65% Mn, 34.3% Cu and 0.6% V) when the alloy has been aged for 1 hour and when the alloy has been aged for 8 hours. FIG. 3 shows the damping characteristics of alloy 5 (65.0% Mn, 33.5% Cu and 1.3% V) when the alloy has been aged for 1 hour, 2 hours and 4 hours, respectively. The results of these tests clearly show that increased aging time effectively increases the damping capacity of the alloy at the upper end of the temperature range and raises the temperature limit at which useful damping may be obtained.

As shown in FIG. 1, the upper temperature limit for useful damping of manganese-copper base alloys is about 90°–100° C. It has also been found that the damping capacity of binary manganese-copper alloys at the upper end of the useful temperature range (that is, 90°–100° C.) deteriorates even more when the alloy is held or aged at that temperature. This loss of damping capacity, when the alloy is held at 90°–100° C., is considerably reduced in the ternary vanadium-containing alloys of this invention. The presence of vanadium in the alloy appears to stabilize the damping near the upper temperature limit.

In order to demonstrate this stabilizing effect, alloys 1, 3 and 5 (Table I) were held at a temperature of about 100° C. for extended periods of time and the damping capacity of the alloy then determined. The results of this test are set forth in Table III.

TABLE III

| Alloy No.: | Holding temp., °C. | Holding time, hrs. | Damping capacity, Q— ×10³ |
|---|---|---|---|
| 1 | 100 | 0 | 7.0 |
|  | 100 | 0.75 | 1.9 |
|  | 100 | 3.5 | 0.2 |
|  | 100 | 20.0 | 0.1 |
| 3 | 100 | 0 | 8.1 |
|  | 100 | 2.5 | 7.3 |
|  | 100 | 19.0 | 5.0 |
| 5 | 105 | 0 | 13.4 |
|  | 105 | 0.66 | 6.4 |
|  | 105 | 3.3 | 4.4 |

These data clearly show that the damping capacity of the binary manganese-copper alloy (alloy 1) rapidly deteriorates when the alloy is held at 100° C. The loss of damping capacity while being held at 100° C. was considerably less in the ternary alloys of the present invention (alloys 3 and 5, above). It appears that the presence of vanadium in the alloy assists in stabilizing the damping at the upper temperature limit, thereby making the ternary alloys particularly well suited for applications where damping at higher temperatures is required.

It will be understood that the ternary alloys of the present invention may have a composition outside the range of components specifically tested hereinabove. Thus, alloys containing between 60% and 70% by weight manganese, between 30% and 40% by weight copper and between 0.25% and 5% by weight vanadium are within the scope of this invention.

The ternary alloys of the present invention may be employed for various purposes which will be apparent to those skilled in the art in light of the present description. Where not otherwise stated, all parts and percentages are given as parts and percentages by weight and the temperatures are in degrees centigrade.

What is claimed is:

1. A ternary damping alloy consisting essentially of between about 60% and 70% by weight manganese, about 30% to 40% by weight copper and about 0.25% and 5% by weight vanadium.

2. The damping alloy defined in claim 1 in which said alloy contains between 64% and 66% by weight manganese, between 33% and 36% by weight copper and between 0.5% and 1.5% by weight vanadium.

3. A method of extending the upper temperature range of damping capacity of a solution-treated ternary manganese-copper-vanadium damping alloy consisting essentially of about 60% to 70% by weight manganese, about 30 to 40% by weight copper and about 0.25% to 5% by weight vanadium, which comprises aging said damping alloy at a temperature of about 450° C. for at least four hours.

4. The method defined in claim 3 in which said damping alloy is aged at 450° C. for a period of time between four and eight hours.

References Cited

UNITED STATES PATENTS

| 2,259,459 | 10/1941 | Dean | 75—134 |
| 2,263,571 | 11/1941 | Dean | 75—134 |
| 2,294,389 | 9/1942 | Dean et al. | 75—134 |
| 2,366,601 | 1/1945 | Dean | 75—134 |

CHARLES N. LOVELL, Primary Examiner

U.S. Cl. X.R.

148—32.5, 158